United States Patent [19]  
Maeno et al.

[11] Patent Number: 4,749,110  
[45] Date of Patent: Jun. 7, 1988

[54] SPRAY CAN

[75] Inventors: Kunio Maeno; Tatsuya Murachi, both of Aichi, Japan

[73] Assignee: Toyoda Gosei Co., Ltd., Nishikasugai, Japan

[21] Appl. No.: 9,599

[22] Filed: Jan. 29, 1987

Related U.S. Application Data

[63] Continuation of Ser. No. 744,064, Jun. 12, 1985, abandoned.

[30] Foreign Application Priority Data

Jun. 14, 1984 [JP] Japan ................... 59-122360

[51] Int. Cl.$^4$ .......................... C09D 5/20; B65D 83/00
[52] U.S. Cl. ........................................ 222/394; 106/2
[58] Field of Search ............................................. 106/2

[56] References Cited

U.S. PATENT DOCUMENTS

| | | | |
|---|---|---|---|
| 3,308,080 | 3/1967 | Haenni | 528/10 |
| 3,355,474 | 11/1967 | Wheeler | 106/38.22 |
| 3,438,930 | 4/1969 | Beers | 528/10 |
| 3,460,981 | 8/1969 | Keil | 528/38 |
| 3,883,628 | 5/1975 | Martin | 106/38.22 |
| 3,941,856 | 3/1976 | Creasey | 528/38 |

FOREIGN PATENT DOCUMENTS 1433343  4/1976  United Kingdom ................. 106/2

OTHER PUBLICATIONS

"Chemistry of Organic Compounds" Noller, C.R., p. 804, 1965.

Primary Examiner—Theodore Morris  
Attorney, Agent, or Firm—Cushman, Darby & Cushman

[57] ABSTRACT

This invention concerns a spray can.

The spray can comprises (a) a water-repellent surface treating agent composed of a polyorganosiloxane represented by the general formula, $HO[R_2SiO]_nH$ wherein R denotes a monovalent substituted or unsubstituted hydrocarbon group and n a numeral of the value of 5000 to 100,000, and possessed of hydroxyl groups one each at the opposite terminals thereof and a silane coupling agent, (b) a silicone oil as a freezing property improving agent, (c) γ-aminopropyl triethoxy silane as a silane coupling agent, (d) dibutyl tin dilaurate as a catalyst, (e) a mixed solvent consisting of 1,1,1-trichloroethane and 1,1,1-trichloroethylene and used for the dissolution of the composition of the components (a) through (d) mentioned above, (f) Freon R-12 as a solvent capable of assuming a gaseous state at room temperature under atmospheric pressure and used for addition to the aforementioned mixed solvent, and (g) a can body to be filled with the components (a) through (f) mentioned above.

2 Claims, No Drawings

SPRAY CAN

This is a continuation of application Ser. No. 744,064, filed June 12, 1985, now abandoned.

BACKGROUND OF THE INVENTION

1. Field of the Invention

This invention relates to a spray can filled with a water-repellent surface treating agent.

2. Description of the Prior Art

The spray can containing a water-repellent surface treating agent composed preponderantly of silicone oil, for example, and enjoying popular use for long to date is desired to use as low gas pressure as possible (not more than 12 kg/cm$^2$ 50° C., for example). Unfortunately, it has entailed the problem that when it is left standing for long where the atmospheric temperature is in the neighborhood of 80° C., for example, the gas pressure inside the can rises above the stated tolerable level.

SUMMARY OF THE INVENTION

An object of this invention is to provide a spray can constructed so that the gas pressure inside the can is not suffered to rise above the stated tolerable level even when the can is exposed to elevated temperatures of 80° to 100° C.

To accomplish the object described above according to this invention, there is provided a spray can which comprises a water-repellent surface treating agent composed of a polyorganosiloxane represented by the general formula, HO[R$_2$SiO]$_n$N wherein R denotes a monovalent substituted or unsubstituted hydrocarbon group and n an integer of the value of 5000 to 100,000, and possessed of hydroxyl groups one each at the opposite terminals thereof and a silane coupling agent, a solvent capable of assuming a gaseous state at room temperature under atmospheric pressure, and a can body to be filled with the water-repellent surface treating agent and the solvent mentioned above.

The other objects of the present invention will become apparent from the comprehension of preferred embodiments to be described herein below and they will be indicated in the appended claims. Many advantages of this invention which are not mentioned in the text hereof will reveal themselves to persons of ordinary skill in the art who proceed to reduce the invention to practice.

DETAILED DESCRIPTION OF THE PREFERRED EMBODIMENTS

Now, one preferred embodiment of this invention will be described below. First, typical formulations of the water-repellent surface treating agent contemplated by the present invention will be cited.

Formulation 1

A water-repellent surface treating agent having the following components in the portions indicated in parts by weight below is used.

| | |
|---|---|
| Polyorganosiloxanes having hydroxyl groups one each at the opposite terminals thereof | |
| HO[(CH$_3$)$_2$SiO]$_{13500}$H | 100 |
| HO[(CH$_3$)$_2$SiO]$_{190}$H | 50 |
| Freezing property improving agent | 20 |
| Silicone oil (100000 cst) | |
| Silane coupling agent | 100 |
| γ-Aminopropyl triethoxy silane | |
| Catalyst | 5 |
| Dibutyl tin dilaurate | |

In a mixed solvent consisting of 20.8 parts of 1,1,1-trichloroethane and 78 parts of 1,1,1-trichloroethylene (silicone content 5.0%), 5.2 g of the composition shown above is dissolved. An empty spray can is filled with the resultant solution plus 310 parts of Freon R-12, a solvent capable of assuming a gaseous state at room temperature under atmospheric pressure.

The amount of the aforementioned catalyst is desired to fall roughly in the range of 0.6 to 20 parts as metal in the catalyst. If this amount is not more than 0.6 part, the curing does not proceed. If it exceeds 20 parts, the reaction proceeds too quickly and the adhesiveness of the deposited spray is rather impaired than improved. Besides dibutyl tin dilaurate mentioned above, examples of the catalyst effectively usable herein include zinc octylate, iron octylate, ethyl titanate, and butyl titanate. Other examples are acids, alkalis, amines, and organic metal salts of cobalt, lead, manganese, chromium, and zirconium which are generally available for catalyzing siloxanes.

The aforementioned solvent is only required to be capable of dissolving the aforementioned composition. It is desired to contain solids in a concentration falling roughly in the range of 1 to 10%, preferably 2 to 5%, and more preferably 2.5 to 3.5%. If the concentration of solids exceeds 10%, the content of the spray can no longer can be dispersed by spraying. If the concentration is not more than 1%, then the content is deficient in water repellency. Examples of the solvent effectively usable herein include n-hexane, n-heptane, gasoline, benzene, toluene, iso-propyl alcohol, butyl alcohol, methylethyl ketone, 1,1,1-trichloroethane, trichloroethylene, dimethyl ether, and methylene chloride.

Concrete examples of the solvent capable of assuming a gaseous state at room temperature under atmospheric pressure are fluorine-containing hydrocarbons of Freon series including Freon R-11, Freon R-13, Freon F-14, Freon R-21, Freon R-22, Freon R-112, Freon R-114, and Freon F-115 besides Freon R-12 mentioned above.

Examples of the silane coupling agent usable advantageously herein include epoxy group-containing polyorganosiloxanes such as:

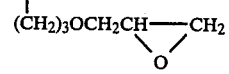

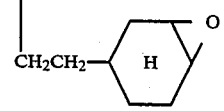

and amino group-containing silane-siloxanes such as γ-aminopropyl triethoxy silane, γ-(N-β-aminoethyl)-aminopropyl triethoxy silane, and N-methyl-γ-aminopropyl triethoxy silane.

The spray can filled as described above is tested for change of gas pressure. The results show that the gas pressure reaches 12 kg/cm$^2$ when the ambient temperature is elevated to 100° C. This value, as compared with the gas pressure, 12 kg/cm², generated at 50° C. in the conventional spray can filled with a water-repellent surface treating agent, indicates that the present spray can keeps the gas pressure therein to a much lower level than the conventional spray can.

By way of comparison, a typical formulation of the water-repellent surface treating agent contained in the aforementioned conventional spray can is shown below, with the proportions of components thereof indicated in parts by weight.

| | |
|---|---|
| Silicone oil (10 cst; product of Toshiba Silicone Co., Ltd. marketed under trademark designation of F-451) | 100 |
| 1,1,1-Trichloroethane (8% solution) | 100 |

An empty spray can is filled with the composition shown above plus 306 parts of Freon R-12 and 202 g of dimethyl ether.

This invention is not limited to the working example described above. Any composition obtained by suitably selecting the aforementioned substances and combining them in proportions falling within the respective specified ranges can be used for this invention. For example, this invention may be embodied similarly effectively with any of the formulations cited below by way of example.

Formulation 2

| | |
|---|---|
| Polyorganosiloxane possessing hydroxyl groups one each at the opposite terminals thereof HO[(CH$_3$)$_2$SiO]$_{1000}$H | 100 |
| Freezing property improving agent Silicone oil (80000 cst) | 30 |
| Silane coupling agent γ-Aminopropyl triethoxy silane | 100 |
| Catalyst Dibutyl tin dilaurate | 5 |

In a mixed solvent consisting of 17.6 parts of 1,1,1-trichloroethane and 155 parts of 1,1,1-trichloroethylene (solids content 2.5%), 4.4 g of the composition shown above is dissolved. An empty spray can is filled with the resultant solution plus 221 parts of Freon R-12.

Formulation 3

| | |
|---|---|
| Polyorganosiloxanes possessing hydroxyl groups one each at the opposite terminals thereof | |
| HO[(CH$_3$)$_2$SiO]$_{13500}$H | 100 |
| HO[(CH$_3$)$_2$SiO]$_{300}$H | 50 |
| Freezing property improving agent | |
| Silicone (CH$_3$)$_3$SiO[(CH$_3$)HSiO]$_{48}$Si(CH$_3$)$_3$ | 5 |
| Silane coupling agent | |
| HO(CH$_3$)$_2$SiO[(CH$_3$)SiO]$_{20}$[(CH$_3$)$_2$SiO]$_{280}$—Si(CH$_3$)$_2$OH 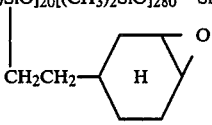 | 100 |
| Catalyst | |
| Dibutyl tin dilaurate | 5 |

In a mixed solvent consisting of 20 parts of 1,1,1-trichloroethane and 47.5 parts of 1,1,1-trichloroethylene, 0.5 g of the composition shown above is dissolved. An empty spray can is filled with the resultant solution plus 152 parts of Freon R-12.

Formulation 4

| | |
|---|---|
| Polyorganosiloxanes possessing hydroxyl groups one each at the opposite terminals thereof | |
| HO[(CH$_3$)$_2$SiO]$_{13500}$H | 100 |
| HO[(CH$_3$)$_2$SiO]$_{60}$[(C$_6$H$_5$)$_2$SiO]$_3$H | 50 |
| Freezing property improving agent | |
| Silicone (CH$_3$)$_3$SiO[(CH$_3$)HSiO]$_{48}$Si(CH$_3$)$_3$ | 5 |
| Silane coupling agent | |
| (CH$_3$)$_3$SiO[(CH$_3$)SiO]$_{10}$[(CH$_3$)$_2$SiO]$_{100}$Si(CH$_3$)$_3$ 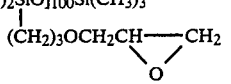 | 50 |
| Catalyst | |
| Zinc octylate | 10 |

In a mixed solvent consisting of 16.0 parts of 1,1,1-trichloroethane, 30.0 parts of 1,1,1-trichloroethylene (solids content), and 101 parts of dimethyl ether, 4.0 g of the composition shown above is dissolved. An empty spray can is filled with the resultant solution plus 152 parts of Freon R-12.

Formulation 5

The composition of Formulation 4 shown above is combined with 30 parts of dimethyl silicone oil as a freezing property improving agent. A water-repellent surface treating agent is produced by following the procedure of Formulation 4, except that 4.0 g of the product of the aforementioned combination is used instead.

In such cold nothern districts as Hokkaido, North America, and Nothern Europe, water adheres to various parts of automobiles during the winter season. As the outdoor temperature falls below −5° C., the adhering water freezes as on the contact faces of doors and weather strips, the contact surface of a trunk and a weather strip, mud guards, and key holes. Great force, therefore, is required in opening a door or a trunk against the cohesive force of ice. At times, the great force may cause breakage of the weather strip. When the aforementioned water-repellent surface treating agent is applied on the aforementioned contact surfaces as by spraying, the following effects can be derived.

(1) When ice is formed on the contact surfaces of a door and a weather strip, the applied agent enables the door to be smoothly opened by a feeble pull exerted by a child's hand.

(2) When ice is formed on the contact surfaces of a trunk and a weather strip, the applied agent enables the trunk lid to be smoothly opened similarly.

(3) When the surface treating agent sprayed into the key hole, the water adhering to the key hole is now allowed to freeze. Thus, the key hole readily admits the key.

The aforementioned parts of automobiles are not the only items that enjoy the protection offered by the water-repellent surface treating agent against the cohesive force of ice. For example, this agent applied on window sills and door frames in residences in the cold nothern districts manifest the same effects as described above.

To demonstrate the effect of the water-repellent surface treating agent of the aforementioned spray can, the spray can is subjected to the following test. The aforementioned surface treating agent is applied by spraying on the contact surfaces of a door and a weather strip in an automobile. The automobile is then left standing in a freezer room at $-20°$ C. for five hours. At the end of the standing, the door is opened and the force required for the opening is recorded.

The results of this test are shown in Table 1.

TABLE 1

| Agent used | Force required (kg) |
| --- | --- |
| Formulation 1 | 7 |
| Formulation 2 | 10 |
| Formulation 3 | 15 |
| Formulation 4 | 11.5 |
| Formulation 5 | 11.5 |
| No agent used | 25 |

It is clear from Table 1 that the doors treated with the water-repelling surface treating agent of this invention are opened with force less than half the force required in opening the doors not treated with the agent.

As described in detail above, the spray can of the present invention enables the gas pressure inside the can body to be held down to a low level even when the can is left standing at a place where the ambient temperature rises to the range of 80° to 100° C. Thus, it fully meets the official standard and functions far on the safer side.

Obviously, many modifications and variations of the present invention are possible without departure from the spirit and scope of this invention as set forth in the appended claims hereof.

What is claimed is:

1. A spray can comprising:
   (I) a water-repellent surface treating agent of a nonpolar polymer composed of
      (A) 100 parts by weight of a polyorganosiloxane represented by the general formula HO[R$_2$SiO]$_n$H, wherein R denotes a monovalent substituted or unsubstituted hydrocarbon group and n is a numeral of the value of 5000 to 100,000, said polyorganosiloxane possessing hydroxyl groups one at each of the opposite terminals thereof,
      (B) at least 5 parts by weight of a freezing property improving agent composed of silicone oil,
      (C) 50 to 100 parts by weight of a silane coupling agent composed of any one member selected from the group consisting of γ-aminopropyl triethoxy silane, γ-(N-β-aminoethyl)-aminopropyl triethoxy silane, and N-methyl-γ-aminopropyl triethoxy silane, and
      (D) up to 10 parts by weight of a catalyst composed of any one member selected from the group consisting of dibutyl tin dilaurate, zinc octylate, iron octylate, ethyl titanate, and butyl titanate,
   (II) a solvent for dissolving said water-repellent surface treating agent,
   (III) fluorochlorine and fluorobromine substitution products of methanes or ethanes as a solvent capable of assuming a gaseous state at room temperature under atmospheric pressure, and
   (IV) a can body filled with said (I) through (III) mentioned above.

2. A spray can according to claim 1, wherein said silane coupling agent is γ-aminopropyl triethoxy silane, said catalyst is dibutyl tin dilaurate, said solvent for dissolving said water-repellent surface treating agent is a mixed solvent consisting of 1,1,1-trichloroethane and 1,1,1-trichloroethylene, and said Freon as a solvent is Dichlorodifluoromethane.

* * * * *